March 10, 1931.  A. S. VAN HALTEREN  1,795,582
DISTRIBUTING APPARATUS
Filed March 12, 1927  4 Sheets-Sheet 1

Inventor:
Andrew S. Van Halteren.
By Cromwell, Greist & Ward
Attys

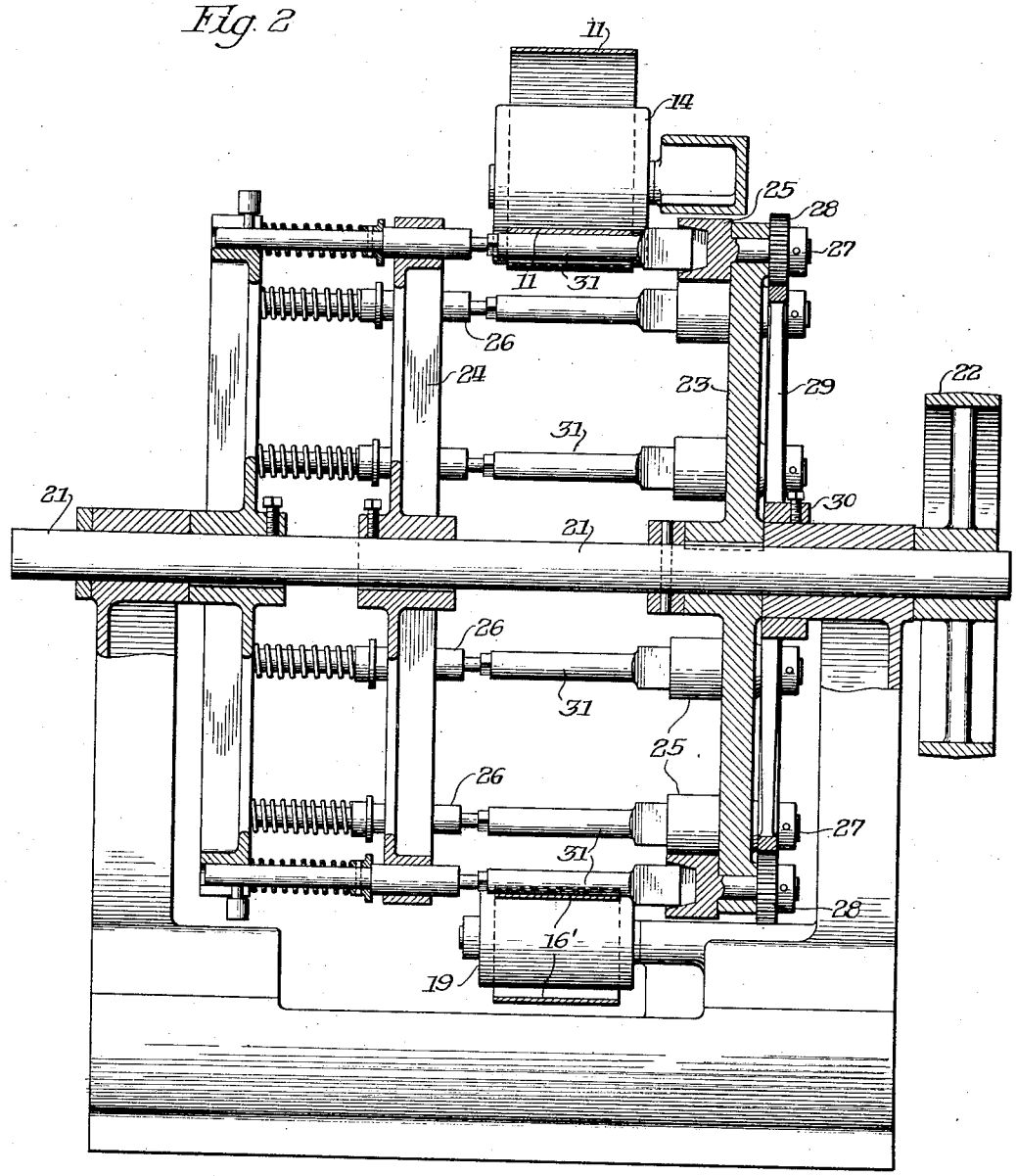

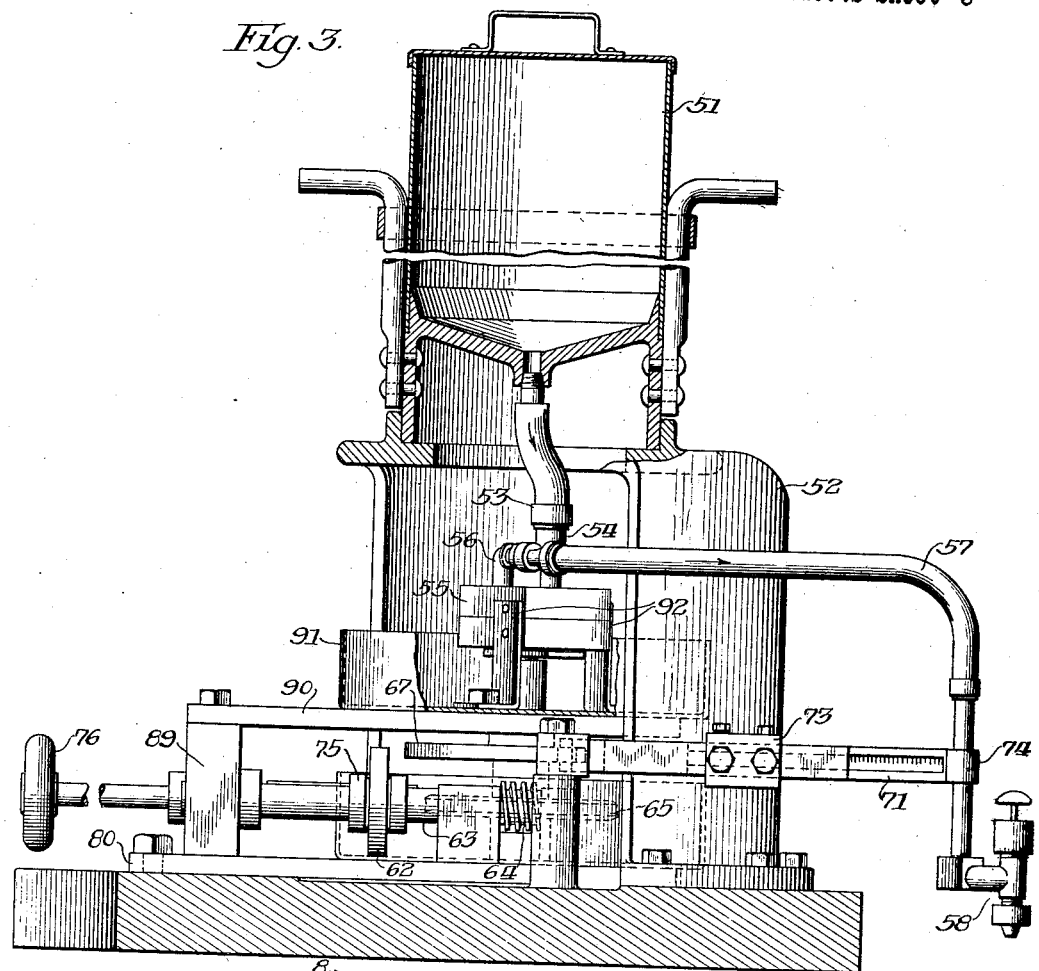

Inventor:
Andrew S. Van Halteren.
By Cromwell Grist, Warden
Attys

Patented Mar. 10, 1931

1,795,582

UNITED STATES PATENT OFFICE

ANDREW S. VAN HALTEREN, OF EAST LANSING, MICHIGAN, ASSIGNOR, BY MESNE ASSIGNMENTS, TO MOTOR WHEEL CORPORATION, OF LANSING, MICHIGAN, A CORPORATION OF MICHIGAN

DISTRIBUTING APPARATUS

Application filed March 12, 1927. Serial No. 174,723.

This invention relates to an apparatus adapted to distribute a liquid or a freely flowing semi-solid uniformly over a moving surface.

More specifically the invention relates to an apparatus for distributing a viscous coating or filling material over a moving belt, which belt carries and further distributes the material over the surface of a solid body which is to be coated or filled.

The apparatus is of special value in connection with the spoke coating or filling distributing machine as described and shown in the Patent No. 1,660,535 granted Feb. 28, 1928.

The apparatus of the prior application was designed to replace the unsatisfactory manual method of distributing filler material upon the wooden spokes of automobile wheels, chair rungs, base ball bats, and other similar articles by a brush, followed by rubbing the filler material into the wood and removing the surplus by a cloth or other fibrous friction body. The apparatus of the above application accomplished the filling or coating operation in a more efficient and uniform manner by passing the objects to be filled successively into contact with moving friction belts which distribute the coating or filling material upon such objects. One of the friction belts was used to carry the filler material and cause its distribution upon the surface of the rounded body, while another friction belt was used to rub in and further distribute the material and to wipe off the excess.

In the operation of this machine it is necessary to distribute the filler material in thin layers by hand upon the filler carrying belt. It was found very difficult to secure a uniform distribution of the filler material upon the belt, and it was also found difficult to regulate in a satisfactory manner the rate of feeding the material to the objects to be coated or filled.

The object of this invention is to provide a means which will controllably distribute the filling or coating material upon the belt so that it will be distributed evenly over the surface of the object and so that it can be supplied in the desired quantities to the surface of the object.

To facilitate a clearer understanding of one form of mechanism for practicing the invention, there is herein illustrated the invention as applied to the coating and filling of wheel spokes.

In the drawing:

Figure 2 is a section along the line 2—2 of Figure 1 and shows the manner in which the spokes are held and rotated.

Figures 3 to 8 show the distributing device and various details thereof.

Figure 3 is a section of the distributing device taken along the line 3—3 of Figure 4.

Figure 4 is a top view of the distributing device taken along the line 4—4 of Figure 1.

Figure 5 is a section of the lower portion of the distributing device taken along the line 5—5 of Figure 4.

Figures 6 to 8 show the metering device and its various details.

Figure 6 is a section through the metering device upon the line 6—6 of Figure 5.

Figure 7 illustrates the method of operation of the metering device and is a section taken upon the line 7—7 of Figure 6.

Figure 8 is a section of the metering device taken upon the line 8—8 of Figure 6.

Figure 1:
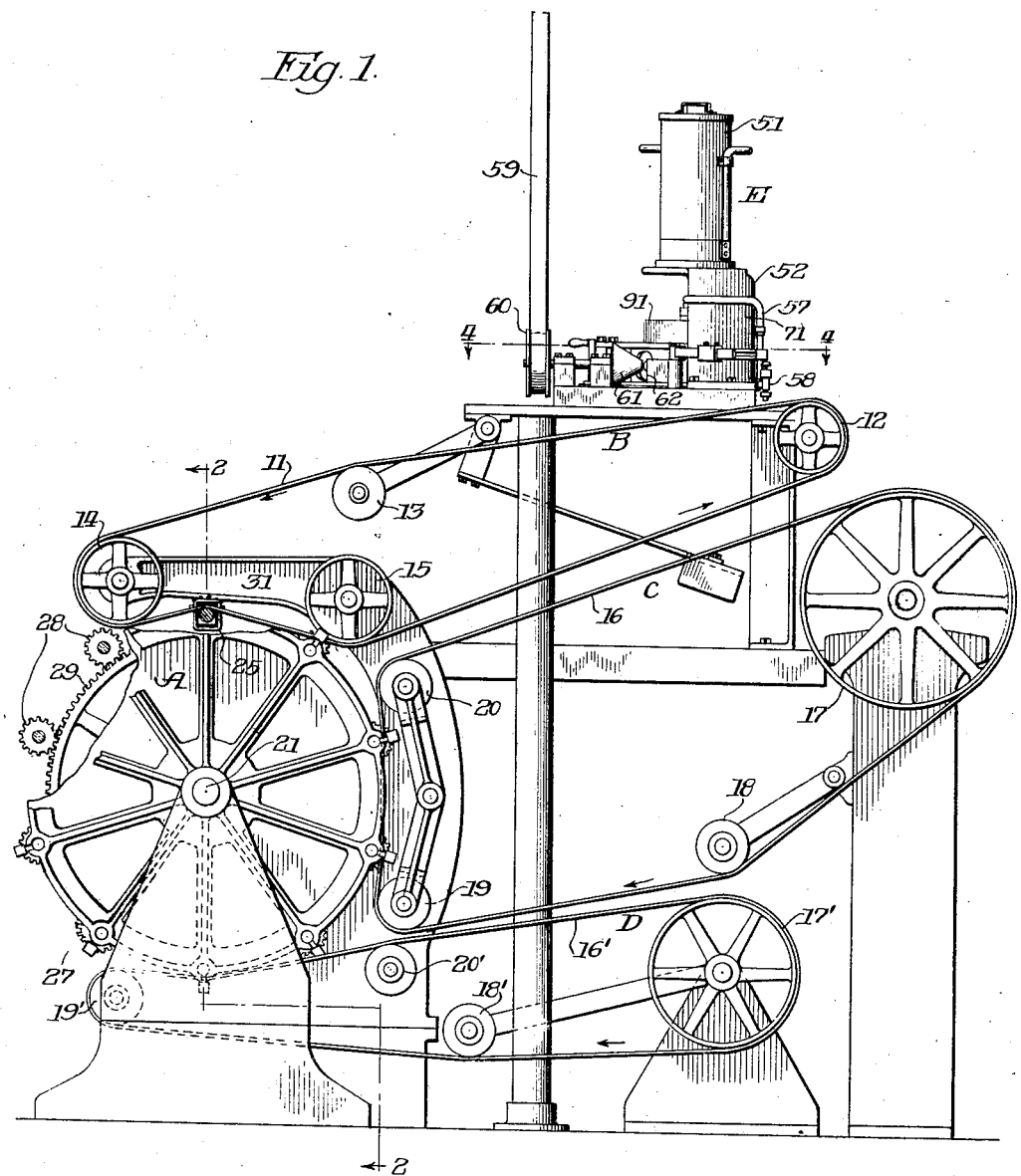
Figure 1 is a side view of the spoke holding mechanism, the distributing and wiping belts, and the distributing device, showing their relative location.

The general combination is shown best upon Figure 1. It consists of a cage-like drum A for carrying and causing rotation of the spokes, of a filler-distributing belt B, of two wiping belts C and D, and of the distributing or spreading device E.

The belts are best shown upon Figure 1. A filler-distributing belt 11 is driven from a pulley 12 and passes over a tension roller 13 and idlers 14 and 15. Two wiping belts 16 and 16' are driven by the pulleys 17 and 17' respectively, which belts pass over the tension maintaining devices 18 and 18' and the idler pulleys 19 and 20, and 19' and 20'.

The filler-distributing belt 11 is made preferably of a closely woven fabric, being adapted for impregnation with a filler composition, which is applied to the surface thereof by the distributing or spreading device. The wiping belts 16 and 16′ are also advantageously made of closely woven fabric adapted to supplement the belt 11 in causing penetration of the composition into the pores of the wood and to remove therefrom any surplus material.

The direction of drive indicated upon the drawing for the wiping belts may be reversed and the number of filler-distributing and wiping belts used may be varied. When it is necessary to distribute a large amount of filler material it may be necessary to use two or more filler-applying belts.

The means of holding and causing rotation of the spokes is best shown upon Figure 2. Upon the shaft 21, driven by the pulley 22, is mounted a cage-like drum or reel comprising the side frame members 23 and 24, the former being provided with centering head chucks 25 and the latter with centering spindles 26. Upon the axle 27 of each of the head chucks 25 is mounted a pinion 28. These head chucks and tail spindles are mounted in an opposed relation to each other and in an annular series about the shaft 21. A ring gear 29 is carried by the boss 30 which is fixed upon the machine frame, and it serves as a toothed-rack, with which all of the pinions 28 mesh, and by which they are rotated upon their respective axes as they revolve about the shaft 21. The objects to be treated, spokes 31 for example, have one end seated in the head chucks 25 and the other releasably held by the spring pressed tail spindles 26, and they therefore are held in a position transverse to their path of revolution about the drum axis, and also transverse to the path of the moving belts 11, 16 and 16′, the plane of revolution of the spokes being parallel to and included within the planes of travel of the belts.

The spokes 31 are successively brought into contact with the distributing belt 11 by the revolution of the reel or drum (see Figure 1), and as they are being rotated by the pinions 28 the spoke surface is subjected to a rubbing action by the belt, whereby the filler composition carried by the belt surface is distributed upon and caused to penetrate the porous surface of the spoke. As the spokes progress, after leaving contact with the filler distributing belt, they come into successive contact with the wiping belts 16 and 16′, whereby the filler composition is additionally rubbed into and distributed upon the surface and the surplus removed, the spokes themselves being released from the chucks and replaced by others before the chucks next reach the filler-distributing belt.

The means by which the filler material is distributed upon the moving surface of the belt is best shown upon Figure 3 of the drawing. The can 51, which is provided with a cover to keep out dirt and dust, contains the filler material which is in the form of a viscous liquid. The can is supported upon the bracket 52. A detachable hose 53 connects the lowest part of the can to the inlet 54 of the meter 55. The outlet 56 of the meter is connected to a flexible hose 57, which is in turn connected to the nozzle 58, which nozzle swings backward and forward over the moving filler-applying belt 11.

Figure 5:
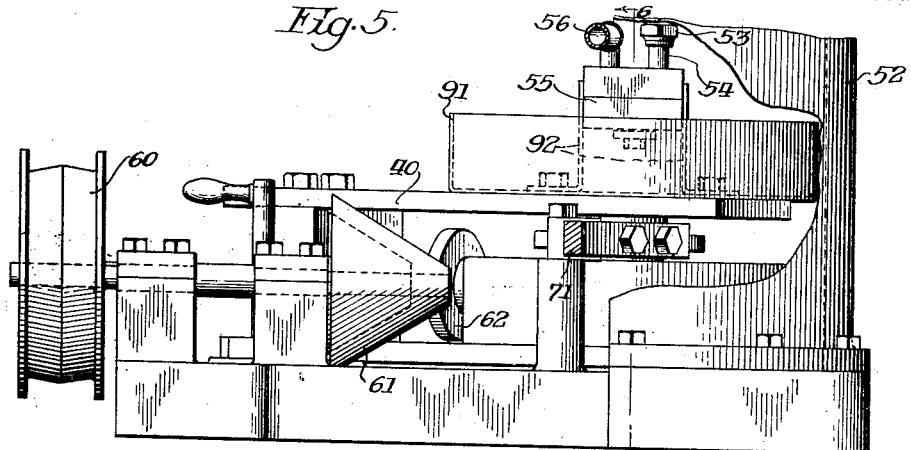

The actuating mechanism for the distributor is best shown upon Figures 1 and 5. The belt 59 drives the pulley 60, which is upon the same shaft as the cone 61. The cone 61 drives the friction wheel or pulley 62, which is splined to the shaft 63 (see Figures 3 and 4). Upon the shaft 63 is also the worm 64, which drives the worm gear 65, which in turn drives the shaft 66. The cam 67 is keyed to the shaft 66, and the meter 55 is connected to the shaft by means of the driving slot 68. The roller or follower 69 is retained against the cam 67 by the spring 70. The roller is attached to the nozzle-carrying arm 71, which is fulcrumed at 72.

The cam 67 will regulate the backward and forward motion of the nozzle 58 over the moving belt 11, and it is possible to change the swing of the nozzle and also to change the distribution of the filler material over the width of the belt by substituting different cams. It is also possible to adjust the length of the arm 71 by the adjustment 73. The adjustment 74 permits the raising or lowering of the nozzle 58 and it also permits the nozzle to be held at different angles in respect to the arm 71.

Figure 4:
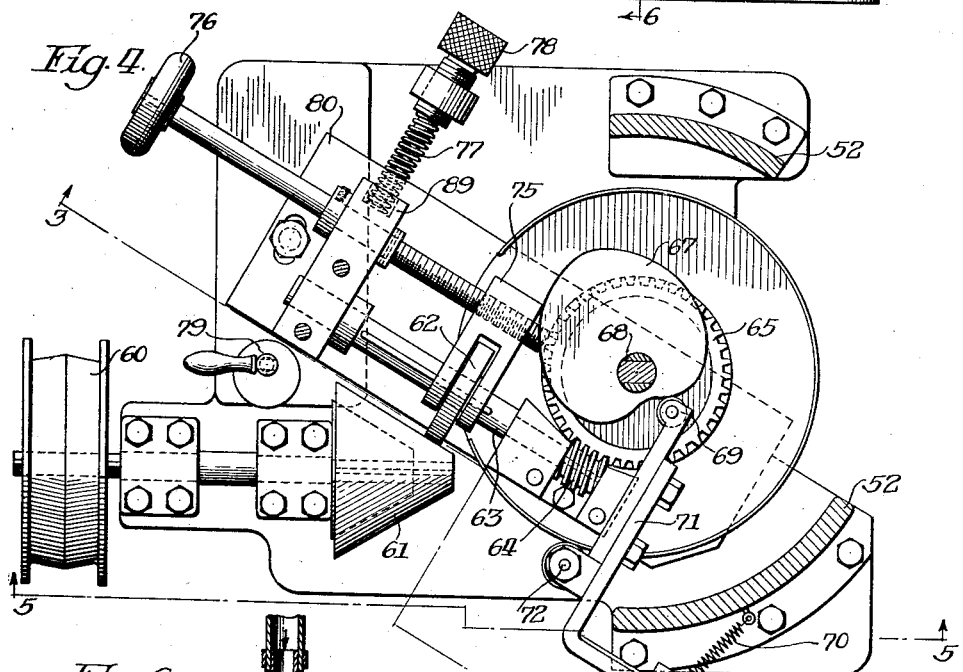
Figure 8:
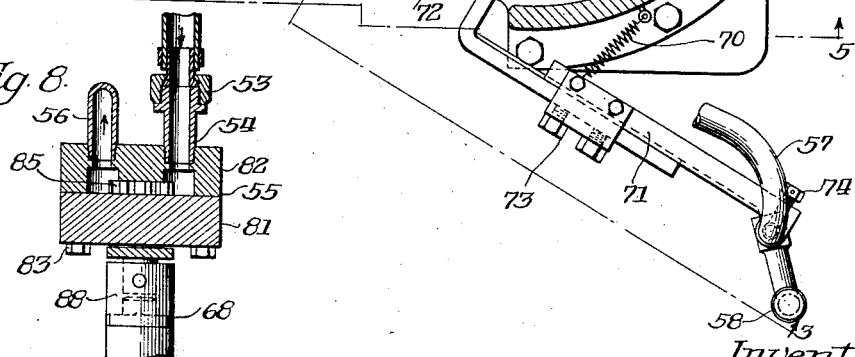

The means for adjusting the rate of feed are best shown upon Figure 4. The friction wheel or pulley 62 can be moved up and down along the cone 61 by means of the shift or yoke 75, which is moved by turning the handle 76. The friction wheel 62 is loosely splined to the shaft 63. The spring 77, the tension of which can be regulated by the adjusting screw 78, holds the friction wheel 62 against the cone 61. When it is desired to adjust the position of the friction wheel 62 upon the cone 61, or when it is desired to stop the mechanism without disconnecting the belt 59, the cam 79 can be used to throw the friction wheel 62 out of contact with the cone 61. The plate 80, upon which the friction pulley and its shaft are supported, is pivoted upon the shaft 66, so that the worm 64 will always intermesh with the worm wheel 65.

The metering device is best shown upon Figure 6. The metering device consists of a bottom portion 81 which is smooth upon its inner surface, and a top portion 82 which is recessed upon its inner surface to receive the gears. The two portions are bolted together by the cap screws 83. Intermeshing gears 84 and 85, the latter being the driver gear, set in the recess upon the inner surface of the block 82, and turn in the direction indicated in Figure 7. The gear 84 has a short shaft which is entirely contained within the blocks 81 and 82. The device is driven through the shaft of 85 which is the only revolving part that comes through the body of the meter. To prevent any leakage past the shaft 85, the packing gland 86, which is secured by the cap screws 83, presses a packing material 87 against the shaft of 85. The shaft of 85 has attached to it a collar 88 which is pinned to the shaft of the driver gear 85, which collar is driven by the slot drive 68.

The means for preventing any of the filler material from dripping upon the moving parts and the means for preventing the metering device from turning are best shown upon Figure 3. The part 89 which is bolted to the pivoted plate 80 forms a bearing for the shaft 63 and for the shaft of the adjusting handle 76. A plate 90 is bolted upon the top of 89 and forms an additional bearing for the shaft 66 which drives the cam 67 and the metering device 55. Attached to the plate 90 is a drip pan 91 which serves to catch any filler and dirt as may be spilled when the filler can discharge pipe 53 is attached and detached from the meter inlet 54. There is also attached to the plate 90 through the bottom of the pan 91, two meter guides 92, which prevent the meter from turning with its drive shaft.

The filler material is supplied to the nozzle 58 from the supply can 51 (see Figure 3). The filler material is drawn into the gear meter 55 through the inlet 54 from the supply can, and passes through the meter in the open spaces between the gear teeth (see Figure 7). At the outlet 56 the gears will intermesh again and force out the filler material into the flexible tube 57 and thence into the nozzle 58. By means of the fulcrumed arm 71, which rides by means of a follower 69 upon the cam 67 (see Figure 4) the nozzle 58 is caused to swing back and forth over the belt uniformly distributing the filler material thereupon. By the use of different cams it would be possible to vary the amount of filler applied to different portions of the belt by causing the nozzle to hover over certain portions longer than over others.

The meter 55 and the cam 67 are shown driven from the same shaft but it would be possible to have them driven from different shafts. To increase the speed of the shaft 66, the friction wheel or pulley 62 is shifted to the left by means of the adjusting handle 76 (see Figure 4) and to decrease the speed the friction wheel or pulley 62 is shifted to the right. Variation in the speed of rotation of the shaft 66 would cause a corresponding variation in the speed of the meter 55 and in the movement of the nozzle 58 back and forth across the belt 11.

It will be noted that all parts of the machine cooperate to produce a desired or uniform distribution of coating or filling material over the surface of the wheel spoke or similarly rounded object. The distribution operation may be divided into two steps or stages; (1) the operation of the distributing device which distributes the material over the distributing belt in the desired manner; and (2) the operation of the distributing belt which distributes the materials over the surface of the spoke in a similar manner.

What is claimed is:

1. In a distributing machine, a moving belt for carrying filler material to and distributing it upon objects, a nozzle adapted to supply filler material to the belt, a cam adapted to cause a backward and forward motion of the nozzle over the belt, a metering device adapted to supply filler material to the nozzle, said cam and metering device being driven from the same shaft, and means for driving said shaft at different speeds.

2. The apparatus of claim 1 in which the metering device is a gear pump.

3. In a device for distributing a freely flowing material over a moving surface, a nozzle, means for causing said nozzle to move back and forth over said moving surface, and means for supplying the freely flowing material to the nozzle, the means for causing backward and forward motion of the nozzle comprising a cam, in which there are additional means for driving said cam at different speeds.

4. In a device for distributing a freely flowing material over a moving surface, a nozzle, means for causing said nozzle to move back and forth over said moving surface, and means for supplying the freely flowing material to the nozzle, the means for supplying the freely flowing material to the nozzle comprising a metering device, and additional means for driving the metering device at different speeds.

5. In a distributing device, a nozzle, a fulcrumed arm carrying said nozzle at one end thereof, a cam, a follower upon the other end of the fulcrumed arm, a means for holding said follower against said cam, a tube attached to the nozzle, a metering means connected to said tube, and means for actuating said cam and metering means.

6. In a distributing machine, a flexible carrying and distributing friction belt, and means for controllably distributing the coating or filling material upon the belt comprising a device adapted to move backwardly and forwardly over the belt and deposit said material thereupon, means for continuously supplying material to said device and means for effecting a desired variation of speed over different belt areas.

7. In a distributing machine, a flexible carrying and distributing friction belt, and means for controllably distributing the coating or filling material upon the belt comprising a device adapted to move backwardly and forwardly over the belt and deposit said material thereupon, adjustable means for continuously supplying material to said device and means for effecting a desired variation of speed over different belt areas, and means for simultaneously varying the amount of material supplied to the device and the speed of movement of the device.

8. In a machine for distributing filler material upon wheel spokes, a distributing belt for receiving the filler material and applying it to the spoke, means to cause frictional contact between the spoke and the belt and a distributing device to distribute the filler material upon the belt so that it will be distributed upon the spoke in the desired manner so that its surface being coated will rotate at a different rate than the coating surface of the belt.

9. In a machine for distributing filler material upon wheel spokes, a distributing belt for receiving the filler material and applying it to the spoke, means to cause frictional contact between the spoke and the belt, a distributing device to distribute the filler material upon the belt so that it will be distributed upon the spoke in the desired manner, and means to remove the excess material away from the spoke and rub the remaining material into the spoke.

10. In a coating machine, a horizontal distributing belt, a distributing device for placing the coating material upon the upper horizontal surface of the distribution belt, means for bringing the upper surface of the belt into moving frictional contact with a rounded object to be coated, means to rotate the object while in contact with the belt, and means for varying the lateral and longitudinal distribution of the coating material upon the belt.

11. In combination, a moving surface upon which a coating or filling material is adapted to be distributed, a swinging arm intermediately pivoted the outer end of which is adapted to move across and above the moving surface, a distributing nozzle on the outer end of said swinging arm, a follower on the inner end of said swinging arm, a cam adapted to engage said follower and adapted to control the amount and speed of movement of the distributing nozzle, a gear metering device adapted to supply the material to the nozzle, a supply tank above said metering device adapted to supply the material to said metering device, means to drive the cam and the metering device and means adapted to vary the speed of drive.

12. In combination, a moving surface upon which a coating or filling material is adapted to be distributed, a swinging arm intermediately pivoted, the outer end of which is adapted to move across and above the moving surface, a distributing nozzle on the outer end of said swinging arm, a follower on the inner end of said swinging arm, a cam adapted to engage said follower and adapted to control the amount and speed of movement of the distributing nozzle, a gear metering device adapted to supply the material to the nozzle, a supply tank above said metering device adapted to supply the material to said metering device, a cone-and-wheel friction drive adapted to actuate said cam and metering device and means adapted to vary the position of the wheel upon the cone.

13. In a coating machine, a distributing belt for receiving the coating material and applying it to the surface of the object to be coated, a distributing device to distribute the coating material upon the belt, means to cause contact between the surface of the object and the surface of the belt carrying the coating material and means for causing the contacting surfaces of the object and of the belt to move at different linear velocities.

14. In a coating machine, a distributing belt for receiving the coating material upon one surface and applying it to a rounded object, a distributing device to distribute the coating material upon the belt, means for causing contact between the surface of the belt carrying the coating material and the rounded object, and means for drawing the belt down over the surface of the rounded object so that it will contact with a substantial portion thereof, said last mentioned means comprising guides the plane of which is substantially to one side of the surface of the rounded object to be coated when the rounded object is placed in coating position.

15. In a coating machine, a distributing belt, a distributing device for placing the coating material upon the belt, means for bringing the surface of the belt containing the coating material into moving frictional contact with a rounded object to be coated, and means for rotating the object while in contact with the belt so that its surface being coated will rotate at a different rate than the coating surface of the belt.

16. In a coating machine, a distributing belt for receiving the coating material and applying it, means to cause contact between the object to be coated and the belt, a distributing device to distribute the filler material upon the contacting surface of the belt, and other belt means to remove the excess material away from the object being coated.

17. In a device for distributing a freely flowing material over a moving surface, a nozzle, means for causing said nozzle to move back and forth over said moving surface, means for supplying the freely flowing material to the nozzle, and means for effecting a desired variation of speed over different areas of said moving surface.

18. In a distributing apparatus a carrying belt, a nozzle superimposed over a portion of said belt, a flexible hose attached to said nozzle, means for causing a forward and a return sideward motion of the nozzle over the belt, and means for effecting a desired variation of speed over different belt areas.

In testimony whereof I have hereunto signed my name.

ANDREW S. VAN HALTEREN.